(12) United States Patent
Mahdi et al.

(10) Patent No.: US 7,931,773 B2
(45) Date of Patent: Apr. 26, 2011

(54) PRIMER COMPOSITION FOR GLASS BONDING

(75) Inventors: Syed Zafar Mahdi, Rochester Hills, MI (US); Susan Sevidal-Marte, Sterling Heights, MI (US)

(73) Assignee: Dow Global Technologies LLC, Midland, MI (US)

( * ) Notice: Subject to any disclaimer, the term of this patent is extended or adjusted under 35 U.S.C. 154(b) by 826 days.

(21) Appl. No.: 11/866,051

(22) Filed: Oct. 2, 2007

(65) Prior Publication Data
US 2008/0236725 A1 Oct. 2, 2008

Related U.S. Application Data

(60) Provisional application No. 60/828,279, filed on Oct. 5, 2006.

(51) Int. Cl.
| | |
|---|---|
| B60J 1/00 | (2006.01) |
| E06B 3/00 | (2006.01) |
| E06B 5/00 | (2006.01) |
| E06B 7/00 | (2006.01) |
| C04B 37/00 | (2006.01) |
| C08L 83/00 | (2006.01) |
| C08L 83/04 | (2006.01) |
| C08F 8/00 | (2006.01) |
| C08G 18/00 | (2006.01) |

(52) U.S. Cl. ........ 156/325; 156/108; 524/588; 525/100; 525/452

(58) Field of Classification Search .................. 156/108, 156/325; 524/588; 525/100, 452
See application file for complete search history.

(56) References Cited

U.S. PATENT DOCUMENTS

| | | | |
|---|---|---|---|
| 4,367,313 A | 1/1983 | Rizk et al. | |
| 4,374,237 A | 2/1983 | Berger et al. | |
| 4,396,681 A | 8/1983 | Rizk et al. | |
| 4,687,533 A | 8/1987 | Rizk et al. | |
| 4,874,805 A | 10/1989 | Mulhaupt et al. | |
| 4,960,809 A | 10/1990 | Yamaya et al. | |
| 4,963,614 A * | 10/1990 | Ito et al. | 524/495 |
| 5,010,202 A | 4/1991 | Greco | |
| 5,061,749 A | 10/1991 | Ito et al. | |
| 5,109,057 A | 4/1992 | Tsuno et al. | |
| 5,112,911 A | 5/1992 | Mori et al. | |
| 5,206,331 A | 4/1993 | Tsuno et al. | |
| 5,466,727 A | 11/1995 | Hsiech | |
| 5,468,317 A | 11/1995 | Hsiech | |
| 5,852,137 A | 12/1998 | Hsieh et al. | |
| 5,866,657 A | 2/1999 | Tominaga et al. | |
| 6,001,214 A | 12/1999 | Hsieh et al. | |
| 6,015,475 A | 1/2000 | Hsieh et al. | |
| 6,355,127 B1 | 3/2002 | Mahdi et al. | |
| 6,410,640 B1 | 6/2002 | Fukunaga et al. | |
| 6,613,816 B2 | 9/2003 | Mahdi et al. | |
| 6,657,035 B1 | 12/2003 | Nakata et al. | |
| 6,803,445 B2 | 10/2004 | Ishikawa et al. | |
| 6,828,403 B2 | 12/2004 | Mahdi et al. | |
| 6,875,470 B2 | 4/2005 | Trabesinger et al. | |
| 6,984,287 B2 | 1/2006 | Zhang | |
| 7,087,127 B2 | 8/2006 | Mahdi et al. | |
| 7,345,130 B2 | 3/2008 | Zhu et al. | |
| 2001/0041782 A1 | 11/2001 | Okuhira et al. | |
| 2002/0010272 A1 | 1/2002 | Mahdi et al. | |
| 2002/0100550 A1 | 8/2002 | Mahdi et al. | |
| 2003/0100676 A1 | 5/2003 | Okuhira et al. | |
| 2003/0232152 A1 | 12/2003 | Allam et al. | |
| 2004/0077778 A1 | 4/2004 | Hazan et al. | |
| 2004/0188016 A1 | 9/2004 | Mahdi et al. | |
| 2005/0054764 A1 | 3/2005 | Zhou et al. | |
| 2005/0100742 A1 | 5/2005 | Zhang | |
| 2005/0208312 A1 | 9/2005 | Hazan et al. | |
| 2006/0079661 A1 | 4/2006 | Zhu et al. | |
| 2006/0093828 A1 | 5/2006 | Mahdi et al. | |
| 2006/0287408 A1 | 12/2006 | Baikerikar et al. | |
| 2007/0093628 A1 | 4/2007 | Zhu et al. | |
| 2007/0151178 A1 | 7/2007 | Baikerikar et al. | |
| 2007/0157953 A1 | 7/2007 | Mahdi et al. | |
| 2008/0041522 A1 | 2/2008 | Zhu et al. | |
| 2008/0145564 A1 | 6/2008 | Allam et al. | |
| 2008/0152926 A1 | 6/2008 | Baikerikar et al. | |

FOREIGN PATENT DOCUMENTS

| | | |
|---|---|---|
| EP | 1217049 A1 | 6/2002 |
| JP | 2002-309163 A | 10/2002 |
| JP | 2002-309182 A | 10/2002 |
| JP | 2003-128988 A | 5/2003 |
| JP | 2003-336008 A | 11/2003 |

OTHER PUBLICATIONS

General Electric, "Silquest Silanes products and appliances" Product information sheets, p. 1-9 (Sep. 2004).
Incorez, "Oxazolidines—the Incozol" available at: http://incorez.com/Oxazolidines.htm, last accessed Jun. 21, 2006. Bayer Material Science, "Desmodur N 100, Aliphatic Polyisocyanate" Product information p. 1-2, (Jun. 2003).
Bayer Material Science, "Desmodur RFE, Polyisocyanate Crosslinking Agent" Product Information, p. 1-3, (Jul. 1, 2002).
Copending U.S. Appl. No. 12/033,420, filed Feb. 19, 20008.
Copending U.S. Appl. No. 12/041,915, filed Mar. 4, 20008.
Bayer Material Science, "Hardener OZ, Latent Aliphatic Polyaminoalcohol," Product Information, p. 1-2 (Nov. 1, 2002).
Betaseal, "Exxex, Express/ExpressEP, Advanced Cure Auto Glass Urethane Adhesive," Dow Automotive Technical Data, 1-2., (Nov. 2002).
Betaseal One, "One All Application Auto Glass Urethane Adhesive," Dow Automotive Product Information and Instructions, p. 1-4, 2004.
Silquest A-1170 Silane, General Electric, "Adhesion promoter for sealants, adhesives and coatings," p. 1-4, (Sep. 2005).

(Continued)

Primary Examiner — Philip C Tucker
Assistant Examiner — Michael N Orlando
(74) Attorney, Agent, or Firm — Dobrusin & Thennisch PC

(57) ABSTRACT

A one component bonding agent, method of using and articles produced therefrom, comprising from about 3 to 60% by weight of the total primer weight, of a first polymer, the first polymer comprising the reaction product of from about 15 to 85% by weight, based on the total weight of the first polymer, of a first oligomer, wherein the first oligomer comprises the reaction product of an epoxy functional silane and an amine functional monomer and a second oligomer including the reaction product of a monomeric isocyanate and a functionalized tri-alkoxysilane.

19 Claims, No Drawings

OTHER PUBLICATIONS

Special Chem, "Silane Chemistry" 4 pages, available at http://www.specialchem4adhesives.com/tc/silanes/index.aspx?id=chemistry, last accessed Jul. 5, 2006.

Special Chem, "Silane Functionalities" 1 page, available at http://www.specialchem4adhesives.com/tc/silanes/index.aspx?id=functionalities, last accessed Jul. 5, 2006.

Special Chem, "Enhance Substrate Adhesion with Molecular Bridges" 2 pages, available at http://www.specialchem4adhesives.com/tc/silanes/index.aspx?id=adhesionpromoter, last accessed Jul. 5, 2006.

Special Chem, "Eliminate Excess Moisture in your Adhesive/Sealant" 1 pages, available at http://www.specialchem4adhesives.com/tc/silanes/index.aspx?id=dryingagent, last accessed Jul. 5, 2006.

Special Chem, "Improve the Strength of your PU with Endcappers" 3 pages, available at http://www.specialchem4adhesives.com/tc/silanes/index.aspx?id=endcappers, last accessed Jul. 5, 2006.

Special Chem, "Optimise your Adhesive/Sealant Strength" 2 pages, available at http://www.specialchem4adhesives.com/tc/silanes/index.aspx?id=crosslinker, last accessed Jul. 5, 2006.

* cited by examiner

US 7,931,773 B2

PRIMER COMPOSITION FOR GLASS BONDING

CLAIM OF BENEFIT OF FILING DATE

The present application claims the benefit of the filing date of U.S. Provisional Application Ser. No. 60/828,279, filed Oct. 5, 2006, which is hereby incorporated by reference for all purposes.

FIELD OF THE INVENTION

This invention relates to a surface bonding agent, and more particularly to a primer for bonding one or more sealants to a non-porous substrate, such as for bonding a glass panel to an automotive vehicle.

BACKGROUND OF THE INVENTION

In the field of glass bonding, there is a need for a bonding agent, and particularly a primer, which can be used under a range of conditions. One desired function of the bonding agent is to treat the glass surface to ensure a tenacious bond between the glass and sealant (e.g., adhesive). In one application, adhesive or other sealant will be applied shortly after the bonding agent is applied. In other applications the adhesive or other sealant is applied after a considerable period of time has elapsed. It is important in all of these applications that the bonding agent is functional at the time when the adhesive or sealant is applied. It is common to refer to the useful pot life of the bonding agent as its open time. This generally refers to the time between initiation of polymerization of the bonding agent and the time at which an adhesive or other sealant can no longer be applied to the bonding agent and used optimally for bonding. For present glass bonding purposes (particularly for automotive applications), generally, optimum bonding use requires that the failure mode of the adhesive or other sealant to the bonding agent be predominantly cohesive, and more specifically, substantially entirely cohesive.

For example, it is common in one component primers to have an open time that is shorter than 20 seconds. Thus, to help assure that the failure mode of the adhesive or other sealant to the bonding agent is substantially entirely cohesive, the application of the adhesive or other sealant to the bonding agent should occur within 20 seconds of bonding agent application. For a long open time primer, typically a two component material, an elapsed time between application of primer and application of adhesive thereto typically may exceed 90 days. Unfortunately, many two component primers require additional steps labor and handling.

Examples from the literature addressing primer materials in this field include Published U.S. Patent Application Nos. US20010041782A1, 20030100676A1; U.S. Pat. Nos. 5,010, 202; 4,874,805; 4,396,681; 4,367,313; 6,875,470; EP Patent No. 1217049A1; JP Patent Application Publication Nos. JP2003-336008, JP2003-128988, JP2002-309182, and JP2002-309163, all of which are hereby expressly incorporated by reference.

SUMMARY OF THE INVENTION

The present invention is directed at improved bonding agent compositions for bonding one or more adhesives or other sealants to a non-porous substrate, such as a primer for bonding a glass automotive windshield to an automotive vehicle.

In one broad aspect, the invention is directed at compositions that have open times ranging from about 20 seconds to about 90 days or even to about 180 days or even longer (e.g., to about 180 days or longer). Open times of at least about 30 seconds are possible, as are open times of at least about 1 minute, about 5 minutes, about 15 minutes, about one-half hour, about 1 hour, about 8 hours, about 24 hours, about 1 week, about 2 weeks or even at least about 4 weeks or longer. Desirably, the primers of the invention are one-component primers, although the primers disclosed herein can be used in a two-component primer system.

In a more specific aspect, the compositions herein comprise at least two functional groups, namely a first functional group (e.g., at least one functional group containing silicon, and more specifically a silylated polymer) for forming a tenacious bond with a glass substrate to which it is applied; and a second functional group for enabling a reaction with a functional group of an adhesive. For example, desirably, the polymer further contains at least one amine functionality for reacting with an adhesive, preferably a polyurethane adhesive containing isocyanate functionality. In one aspect of the invention, the at least one amine functionality for the primer composition is obtained from a reaction between an amino silane and an epoxy silane.

Accordingly, in one embodiment, the compositions of the present invention comprise an effective amount (e.g., from about 3 to 60% by weight of the total primer weight) of a first polymer, the first polymer comprising the reaction product of:
a) from about 15 to 85% by weight, based on the total weight of the first polymer, of a first oligomer, wherein the first oligomer comprises the reaction product of:
  i. an epoxy functional silane having an epoxy functionality of about 1, and
  ii. a monomer having an amine functionality greater than 1, reacted at a ratio such that the first oligomer contains reactive functional groups selected from primary amine, secondary amine, hydroxyl or any combination thereof; and
b) from about 15 to 85% by weight, based on the total weight of the first polymer, of a second oligomer, wherein the second oligomer comprises the reaction product of:
  i. a monomeric isocyanate having functionality of greater than about 1.9,
  ii. and a monomer having an active hydrogen, and particularly a single active hydrogen, which can react with the isocyanate,
  wherein the first oligomer and the second oligomer are reacted in a ratio such that the second oligomer contains reactive isocyanate functionality; and the first polymer is substantially devoid of free isocyanate functionality.

DETAILED DESCRIPTION OF THE INVENTION

The teachings herein are illustrated with reference to a specific illustrative one component composition, it being recognized that variations (including later discovered functional components) are possible and also within the scope of the invention.

The present invention is predicated upon the surprising discovery of a composition and method that has utility in priming applications, particularly in glass bonding applications, over a range of useful open times. That is, the primers of the present invention can be used in applications requiring an open time from about 20 seconds to about 90 days, or even longer (e.g., to at least about 180 days). Desirably these primers are one-component primers and as such, do not require further mixing by the end-user prior to application to a surface, but still exhibit relatively long open times, particularly as compared with previous one component primers.

In one embodiment, the compositions of the present invention comprise from about 3 to 60% by weight of the total primer weight, of a first polymer, the first polymer comprising the reaction product of:

a) from about 15 to 85% by weight, based on the total weight of the first polymer, of a first oligomer, wherein the first oligomer comprises the reaction product of:
  i. an epoxy functional silane having an epoxy functionality of about 1, and
  ii. a monomer having an amine functionality greater than 1, reacted at a ratio such that the first oligomer contains reactive functional groups selected from primary amine, secondary amine, hydroxyl or any combination thereof; and
b) from about 15 to 85% by weight, based on the total weight of the first polymer, of a second oligomer, wherein the second oligomer comprises the reaction product of:
  i. a monomeric isocyanate having functionality of greater than about 1.9,
  ii. and a monomer having an active hydrogen, and particularly a single active hydrogen, which can react with the isocyanate,
  wherein the first oligomer and the second oligomer are reacted in a ratio such that the second oligomer contains reactive isocyanate functionality; and the first polymer is substantially devoid of free isocyanate functionality.

As will be seen, another way of describing one of the preferred compositions herein is as a bonding agent that includes an epoxy functional silane (e.g., one selected from glycidoxyalkyl trialkoxysilanes, beta-(3,4-epoxycyclohexyl) ethyltrimethoxysilane or a combination thereof); an amine functional component (e.g., a component selected from the group comprising of an alkyldiamine, an aryldiamine, an alkoxydiamine, an amine functional alkoxy silane, and any combination thereof; an alkoxy silane (e.g., a mercapto-trialkoxy-silane, an amino-trialkoxy silane or a combination thereof); and optionally ethylene diamine. An isocyanate also may be present.

The first polymer will have reactive functional groups similar to the functional groups of the first oligomer. In the present invention the reactive function groups of the first polymer can be primary amines, secondary amines, hydroxyl groups, or any combination thereof. Preferably, the reactive functional groups of the first polymer will include or even may consist of secondary amines and hydroxyl groups. Desirably, the first polymer also has alkoxysilane functionality that is hydrolysable, for example in the presence of atmospheric moisture.

As described above, the first oligomer comprises the reaction product of an epoxy functional silane and an amine functional monomer. The first component of the first oligomer, namely the epoxy functional silane preferably has a molecular weight of less than about 1000, and more preferably has a molecular weight, less than about 400 (e.g. about 240). The number of epoxy groups per molecule of the epoxy functional silane desirably is less than about 1.5, more preferably is less than about 1.2, and most preferably is less than about 1.1 (e.g., the epoxy groups per molecule is about 1). Examples of suitable epoxy functional silanes include glycidoxyalkyl trialkoxysilanes such as gamma-glycidoxypropyl trimethoxysilane, which has a molecular weight of about 236 and is commercially available as Silquest A-187 from General Electric. Another example of a monofunctional epoxy silane is beta-(3,4-epoxycyclohexyl)ethyltrimethoxysilane which is commercially available as Silquest A-186 from General Electric. Another example of a monofunctional epoxy silane is Wetlink TM-78 (Mol. Wt: 220) gamma-glycidoxypropyl triethoxysilane from General Electric.

Thus, the epoxy functional silane may be selected from glycidoxyalkyl trialkoxysilanes, beta-(3,4-epoxycyclohexyl) ethyltrimethoxysilane or a combination thereof.

The second component of the first oligomer, namely the monomer having an amine functionality greater than 1, desirably is a polyol or an amine functional monomer selected from the group consisting of an alkyldiamine, an aryldiamine, an alkoxydiamine, an amine functional alkoxy silane, and any combination thereof. In one embodiment, the second component of the first oligomer is preferably an aminosilane containing a total of at least two amines selected from a primary amine, a secondary amines, or any combination thereof. The average number of extractable hydrogen molecules attached to the nitrogen atoms in the amine functional monomer is desirably greater than about 1.5, more preferably is at least about 2, and more preferably is at least about 3, (e.g. about 4). Examples of amine functional alkoxy silanes include gamma-aminopropyltriethoxysilane (commercially available as Silquest A-1100 from General Electric), gamma-aminopropyltrimethoxysilane (commercially available as Silquest A-1110 from General Electric), N-beta-(aminoethyl)-gamma-aminopropyltrimethoxysilane (commercially available as Silquest A-1120 from General Electric and as Dynasilan DAMO-T from Degussa), a triaminofunctional silane (commercially available as Silquest A-1130 from General Electric), and N-beta-(aminoethyl)-gamma-aminopropylmethyldimethoxysilane (commercially available as Silquest A-2120 from General Electric). Thus, the amine functional monomer may be selected from gamma-aminopropyltriethoxysilane, gamma-aminopropyltrimethoxysilane, N-beta-(aminoethyl)-gamma-aminopropyltrimethoxysilane, a triaminofunctional silane, N-beta-(aminoethyl)-gamma-aminopropylmethyldimethoxysilane or any combination thereof.

In one preferred embodiment, the first oligomer comprises the reaction product of an epoxy silane and an amino silane (specifically, a compound containing at least one silane group per molecule, and at least two primary, secondary, (or at least one of each) amino groups per molecule), such as is taught in U.S. Pat. Nos. 5,468,317 and 4,960,809, which are hereby incorporated by reference. Those patents describe examples of suitable reactions of an amino silane and an epoxy silane for use in a primer and list amino silanes and epoxy silanes which may be suitable for the present invention. U.S. Pat. No. 6,828,403, which is hereby incorporated by reference, further lists amino silane molecules which may be suitable for the present invention.

The first oligomer can be prepared by combining the epoxy functional silane monomer and the second monomer (the polyol or amine functional monomer). These ingredients can be combined or mixed using any conventional process, wherein such process may include heating steps and cooling steps. Steps to minimize the presence of moisture may also be taken, including drying of the monomers, drying of any solvents or additives which may be employed, and mixing in a moisture free vesicle. The concentration of the epoxy functional silane monomer that is useful in this invention is from about 15% to about 85% by weight, based on the total weight of the first oligomer. Preferably, the concentration of the epoxy functional silane is from about 35% to about 75% by weight, based on the total weight of the first oligomer, and more preferably is from about 45% to about 65% by weight. The concentration of the second monomer that is useful in this invention is from about 15% to about 85% by weight, based on the total weight of the first oligomer. Preferably the concentration of the second monomer is from about 25% to about 65% by weight, based on the total weight of the first oligomer, and more preferably is from about 35% to about 55%. As mentioned before, it is desirable that essentially all of the epoxide groups are reacted in forming the first oligomer. It is also desirable that the first oligomer molecules have residual amine groups selected from primary amine, secondary amine or combinations thereof. Preferably the average number of primary and secondary amine groups remaining per molecule of the first oligomer is greater than about 0.5, more preferably greater than about 0.9, and most preferably greater than about 1, (e.g. about 2).

The second oligomer used in preparing the first polymer comprises a reaction product of a third and a fourth component, and specifically components that are monomers. The third component desirably is a monomer that contains isocyanate functionality. The isocyanate functionality preferably is at least about 2, more preferably greater than about 2, and most preferably at least about 3 (e.g. about 3, or even about 4 or higher). The molecular weight of the third component (the isocyanate functional monomer) is desirably less than about 2000, and more preferably less than about 800 (e.g. about 200). Examples of suitable monomers for use as the third component of the present invention include aliphatic polyisocyanates, aromatic polyisocyanates, and cycloaliphatic polyisocyanates, or any combination thereof. Materials particularly suitable for use in the present invention include diisocyanates. Examplary diisocyanates which find utility in this invention include trimethyl diisocyanatohexane (TMDI), diphenylmethane diisocyanate (MDI), isophorene diisocyanate (IPDI), hexamethylene diisocyanate (HDI), toluene diisocyanate (TDI) or any combination thereof.

The fourth component desirably is a monomer that contains an active hydrogen which can react with the isocyanate group of the third component. Preferably there is about one active hydrogen per molecule of the fourth component. The active hydrogen desirably is provided from a functionality selected from the group consisting of hydroxy (—OH), secondary amine (—NH), sulfhydryl (—SH) and any combination thereof. In one embodiment the fourth component is a silane that has an active hydrogen atom which is reactive with the isocyanate moiety of the third component. Preferably such silane is a mercapto-silane, an amino-silane or a combination thereof, and more preferably it is a mercapto-trialkoxy-silane, an amino-trialkoxy silane or a combination thereof. One such exemplary fourth component is mercaptopropyl trimethoxysilane (commercially available as Dynasilan™ MTMO from Degussa and as Silquest™ A-189 from General Electric). Another exemplary fourth monomer is bis-(gamma-trimethoxysilylpropyl)amine which contains a secondary amine and is commercially available as Silquest™ A-1170 from General Electric. The molecular weight of the fourth component desirably is less than about 2000, more specifically is less than about 900, and still more specifically, is less than about 500 (e.g. about 200, or even about 80).

The second oligomer can be prepared by combining the third component and the fourth component. These ingredients can be combined or mixed using any art-disclosed process, wherein such process may including heating steps and cooling steps. Steps to minimize the presence of moisture may also be taken, including drying of the monomers, drying of any solvents or additives that may be employed, and/or mixing in a moisture free vesicle. The concentration of the third component (isocyanate functional monomer) that is useful in this invention is from about 15% to about 85% by weight, based on the total weight of the second oligomer. Preferably, the concentration of the isocyanate functional monomer is from about 35% to about 75% by weight, based on the total weight of the second oligomer, and more preferably is from about 45% to about 65% by weight. The concentration of the fourth component that is useful in this invention is from about 15% to about 85% by weight, based on the total weight of the second oligomer. Preferably the concentration of the fourth component is from about 30% to about 70% by weight, based on the total weight of the second oligomer, and more preferably is from about 35% to about 60%. It is desirable that essentially all of the active hydrogen groups of the fourth component are reacted in forming the first oligomer. It is also desirable that the second oligomer molecules have isocyanate groups remaining. Preferably the average number of residual isocyanate groups per molecule of the second oligomer is greater than about 0.5, more preferably greater than about 0.9, and most preferably greater than about 1, (e.g. about 2).

As indicated, the first polymer comprises the reaction product of the first oligomer and second oligomer. This could be the result of reacting the first, second, third and fourth components together in a single step, or by separately reacting either or both of the first and second components, with either or both of the third and fourth components. In one approach the first and second components are reacted independently of the reaction of the third and the fourth components, and the respective resulting first and second oligomers are then reacted together. The concentration of the first oligomer is preferably from about 15% to 85% by weight, based on the total weight of the first polymer. More preferably the first oligomer is present from about 30% to 75% by weight, based on the total weight of the first polymer. The concentration of the second oligomer is preferably from about 15% to 85% by weight, based on the total weight of the first polymer. More preferably the second oligomer is present from about 25% to 70% by weight, based on the total weight of the first polymer. Desirably, the concentrations of the first oligomer and the second oligomer are such that there are essentially no isocyanate functional groups remaining in the first polymer after the first oligomer and the second oligomer are reacted. It is also desirable that there be residual amine or hydroxyl functionality, characteristic of the first oligomer, remaining in the first polymer after the first and second oligomers are reacted.

The first polymer can be prepared by combining the first oligomer and the second oligomer. These ingredients can be combined or mixed using any art-disclosed process, wherein such process may including one or more mixing steps, heating steps or cooling steps. Desirably, steps are taken to minimize the presence of moisture before, during and after the preparation of the first polymer. Such steps may include drying of the oligomers, drying of any solvents or additives which may be employed, and mixing in a moisture free vesicle. It is also desirable to store the first polymer in a container essentially free of moisture.

Desirably, the first polymer has a molecular weight greater than about 1000, and more preferably greater than about 2500 (e.g., greater than about 10,000).

The concentration of the first polymer as employed in a primer (or other bonding agent) composition desirably is greater than about 3% by weight, based on the total weight of the composition. The concentration of the first polymer preferably is greater than about 7% by weight, based on the total primer (or other bonding agent) weight and more preferably is greater than about 12%. The concentration of the first polymer desirably is less than about 60% by weight, based on the total weight of the overall composition. The concentration of the first polymer preferably is less than about 55% by weight, based on the total composition weight and more preferably is less than about 48%.

One or more additional amines may be employed in addition to those identified already. For example, it is possible that a (poly)alkleneamine (e.g., a (poly)ethyleneamine) may be employed, such as ethylene diamine. Such additional amine may be employed in an amount up to about 5% by weight of the overall composition (e.g., about 0.1 to about 1% by weight of the overall composition.

It is contemplated that a bonding agent composition according to the teachings herein further comprises one or more liquids, such as a solvent, plasticizer, diluent, or any combination thereof. If employed, the concentration of any such liquids is preferably from about 1% to about 80% by weight, based on the total composition weight and more preferably from about 40% to about 70% by weight. Examples of suitable liquids that may be employed in the present invention include a hydrocarbon liquid, such as a liquid selected from aromatic hydrocarbons, alcohols, ketones, esters (e.g., acetates) or a combination thereof. An exemplary ketone particularly suitable for the primers of the present invention is methyl ether ketone. An exemplary acetate particularly suitable for the primers of the present invention is 3-methoxy-n-butyl acetate (e.g., Butoxyl). Desirably, the liquid, if employed, may be capable of relatively rapid evaporation, allowing for use of the primer in applications requiring a short open time. Preferably, the boiling point of such fluids is less than about 100° C., and more preferably less than about 80° C. Examples of suitable solvents which may be employed in the current invention include without limitation those taught in U.S. Pat. Nos. 4,960,809 and 5,468,317, incorporated herein by reference, and include (without limitation) methyl alcohol, ethyl alcohol, isobutyl alcohol, 2-ethoxyethyl alcohol and diacetone alcohol, methyl ethyl ketone, methyl isobutyl ketone, ethyl acetate, isobutyl acetate, toluene, xylene, methylene chloride, benzene, monochlorobenzene, trichloroethylene, ethylene chloride, toluene, acetone, methyl ethyl ketone or any combination thereof. Among suitable plasticizers that may be employed are phthalates such as alkyl phthalates.

In one embodiment of this invention, the bonding agent herein may further comprise a film forming resin. Suitable film-forming resins include polyacrylate resins, epoxy resins, polyester resins (polymers of a carboxylic acid and a glycol), polyester copolymers, polyvinyl chloride resins, chlorinated rubber, ethylene vinyl acetate copolymers, polyacrylate copolymers, or any combination thereof. The film forming resin is preferably soluble in any solvent used in the composition. In one preferred embodiment, the film forming resin preferably has a molecular weight of greater than about 3,000 and more preferably greater than about 5,000. The film forming resin preferably has a molecular weight less than about 50,000 and more preferably less than about 30,000. One specific film forming resin is a polyacrylate resin. An example of one particular preferred film forming resin is an acrylic copolymer with a hydroxyl equivalent weight of about 2,000, commercially available in solution from Rohm and Haas Company as Acryloid™ AU-1033. If employed, the concentration of the film forming resin is preferably less than about 25% by weight, and more preferably less than about 18% by weight, base on the total primer weight.

It is also contemplated that a composition according to the teachings herein may further comprise one or more polymers in addition to the first polymer and any film forming resin. Examples of such additional polymers, without limitation, include one or more silyl terminated polymers. If employed, the concentration of any such additional polymers, based on the total weight of the overall composition is preferably less than about 25%, and more preferably less than about 14%.

The composition of this invention may further comprise one or more stabilizers which function to protect the primer composition from moisture, thereby inhibiting advancement and preventing premature cross-linking of the polymer capable of cross-linking in the primer composition. Such stabilizers that may be suitable include those listed in U.S. Pat. No. 6,828,403, incorporated herein by reference. Thus, included among such stabilizers are hydrocarbyl alkoxy silanes, such as vinyl trimethoxy silane, diethylmalonate and alkylphenol alkylates. Such stabilizers may be employed in their art-disclosed amounts, e.g., about 0.1 to about 5% by weight of the bonding agent composition. Larger or smaller amounts are also possible.

Fillers commonly used in polymers and polyurethane primers may be used in the primer compositions of this invention. For example, a suitable filler may include carbon black and preferably surface treated carbon black having a pH of from about 4 to 6. Other suitable fillers may be selected from titanium dioxide, calcium carbonate, surface treated silica, titanium oxide, fumed silica, talc or any combination thereof. If employed, the concentration of the filler is less than 20% by weight, and more specifically is less than about 15% by weight, e.g. about 9% by weight of the overall composition.

It is possible that a primer according to the teachings herein further comprises one or more additives, such as an additive selected from a catalyst, antioxidant, heat stabilizer, UV stabilizers, or any combination thereof. Such additives are well-known to those skilled in the art. If employed, the concentration of any such additives, based on the total weight of the primer is preferably from about 0.1% by weight to about 10.0% by weight, and more preferably from about 0.5% by weight to about 5% by weight. Among preferred heat stabilizers are alkyl substituted phenols, phosphites, sebacates, and cinnamates.

For one illustrative example of the compositions herein, the following ingredients are employed in the recited amounts: a first component of an amine functional alkoxy silane (e.g., N-beta-(aminoethyl)-gamma-aminopropyltrimethoxysilane) in an amount of about 5 to 15 parts by weight, and more specifically about 8 to 10 parts by weight); a second component of an epoxy functional silane (e.g., glycidoxyalkyl trialkoxysilanes) in an amount of about 6 to 16 parts by weight, and more specifically about 9 to 11 parts by weight; a third component of a diisocyanate in an amount of about 5 to 15 parts by weight, and more specifically about 8 to 10 parts by weight); and a fourth component of a mercapto-silane, an amino-silane or a combination thereof, in an amount of about 2 to 10 parts by weight, and more specifically about 5 to 7 parts by weight.

In one specific embodiment, one or any combination of the following additives are included in the composition about 7 to about 15 parts by weight of a film forming resin (e.g., an acrylic co-polymer) and more specifically about 10 to 12 parts by weight; about 1 to about 8 parts by weight of a first solvent (e.g., an acetate) and about 30 to about 70 parts by weight of a second solvent (e.g., a ketone), and more specifically about 40 to 60 parts by weight; and a filler (e.g., carbon black) in an amount of about 5 to about 12 parts by weight, and more specifically about 8 to 10 parts by weight. Ethylene diamine may also be included in an amount of about 0.01 to about 5 parts by weight, and more specifically about 0.1 to about 1 parts by weight, and even more specifically about 0.25 to 0.50 parts by weight.

Compositions herein are useful in priming a substrate to which an adhesive or other sealant is thereafter applied.

Accordingly, one aspect contemplates contacting a substrate with the compositions described herein. More specifically, the compositions herein are useful in methods for securing a glass panel to a structure of a vehicle, such as an automotive vehicle, which includes the steps of (a) applying (e.g., by using any suitable art-disclosed method, such as swabbing, brushing, spraying, dipping, wiping, or otherwise) the bonding agent composition of the invention substantially along the periphery of one side of the glass panel (e.g., window); (b) superimposing on the primer composition a bead of an adhesive (e.g., a moisture-curable urethane adhesive comprising an isocyanate-functional prepolymer and dimorpholinodiethyl ether catalyst); and (c) installing the glass panel by contacting the sealant (e.g., adhesive) with a vehicle structure defining an opening into which the glass panel is to be placed and allowing the adhesive and bonding agent composition to cure. The bonding agent herein is intended to be applied onto or otherwise contacted with a substrate and later covered with a sealant (e.g., an adhesive). Substrates that may be employed include non-porous substrates, such as glass (e.g., plate glass, glass frit, coated glass, tinted glass, reflective glass, tempered glass, annealed glass, or any combination thereof). The composition may be applied to the substrate using any suitable method. Prior to applying the composition to the substrate, the substrate, may undergo a step or steps to clean, dry or otherwise prepare the surface for the primer. Any of a number of adhesives or other sealants may be employed. Suitable commercial examples include, without limitation, those available from The Dow Chemical Company under the designation BETASEAL™ (e.g., Grade Nos. 15-625, 15-685, 15-845 or the like).

The present invention permits the above steps (a) and (b) to be separated by a period of longer than 20 seconds and up to about 1 year (e.g., up to about 3 or even 6 months) at room temperature. More specifically, one method of the present invention contemplates a step of performing the step (b) at least one minute, one hour, one day one week or even one month after step (a) is performed. The step (b) may also be performed within from one minute to three months of step (a), or from one hour to one month of step (a). The lapse of time between the steps (a) and (b) does not appreciably impact the resulting adhesion characteristics of the bonding agent of the invention, with resulting bonds still being capable of withstanding at least 500, 1000, or even 2000 hours of accelerated weathering under a natural sunlight simulator (e.g., a Xenon arc light source, such as by use of weatherometer testing ("WOM") according to SAE J1885, ASTM D2565-99, SAE J1960 or another suitable standard). The following are additional techniques that may be used for analyzing performance herein, and particularly with reference to expected data of the Tables in the following illustrations.

Quick Knife Adhesion Test: A 6.3 mm (width)×6.3 mm (height)×127 mm (length) size bead of adhesive is placed on 25.4 mm×152.4 mm piece of a primed glass, and the assembly is cured for a specific time under the desired conditions (e.g., 23° C. and 50 percent relative humidity). The cured bead is then cut with a razor blade through to the primed surface at a 45 degree angle while pulling back the end of the bead at 180 degree angle. Notches are cut every 3 mm on the surface. The degree of adhesion is evaluated as adhesive failure (AF) and/or cohesive failure (CF). In case of adhesive failure, the cured bead can be separated from the primed surface, while in cohesive failure, separation occurs within the sealant bead as a result of cutting and pulling. In observing the failure mode, it is noted over what portion of the interfacial surface area the failure mode is observed. For example, if cohesive failure is observed in about 90 percent (%) of the interfacial area, it can be reported as 90 CF. Primer failure (PF) is deemed to have occurred if The primer delaminates from the substrate (e.g., glass) to which it is applied.

Lap Shear Test: An adhesive approximately 6.3 mm wide by 8 mm high is applied along the width of a glass primed with the composition herein and approximately 6 mm to 12 mm from the primed end. A painted substrate is immediately placed on the sealant and the sample is allowed to cure at the condition of the 23° C. and 50 percent relative humidity for 5 days. The sample is then pulled at a rate of 1 inch/minute (2.5 cm/min) with an Instron Tester.

Open Time Evaluation: Open time is evaluated by observing performance after applying the bonding agents herein and then aging them for a period of time at a desired temperature and humidity level. Sealant is thereafter applied to the bonding agent, and any additional aging and adhesion testing is performed.

Cataplasma Cycling: The samples are heating in a water bath at 70° C. for 7 days. The samples are then wrapped in cotton wool and sealed in a polyethylene bag. Next, the samples are placed in a freezer for 16 hours at −20° C., after which the sample is allowed to stand at room temperature for 2 hours. The cycle is repeated multiple times, after which the samples are removed from the bag and subjected to the quick knife adhesion test. Desirably, there is no blistering and failure is cohesive in the sealant layer.

The following illustrations, which are not intended to be limiting, demonstrate the compositions of the present invention and certain preferred embodiments thereof. The values shown are approximate and should not be regarded as limiting of the invention. Variations in the processing parameters are possible. In addition, the expected results shown may vary as well (e.g., by about +/−10% of the stated values).

For these illustrations, polyurethane sealants having the same or similar compositional and/or functional characteristics as BETASEAL™ grades 15-625 (sealant #1), 15-685 (sealant #2), and 15-845 (sealant #3), are employed as the sealant.

A first oligomer is prepared by providing 14.805 parts by weight DAMO-T and mixing it for 5 hours at 60° C. with 12.208 parts by weight of Silquest A-187. Mixing is done until an amine equivalent weight can be measured about 240-250. MEK solvent is added until about 100 total weight parts is obtained.

A second oligomer is prepared by mixing 60.92 parts by weight TMDI with 38.94 parts by weight MTMO, 0.07 T-12 catalyst and 0.07 toluene, for a time of 60 minutes, and at a temperature of 85° C.

The first oligomer (82.796 parts by weight) and the second oligomer (17.204 parts by weight are mixed at for a time of about 15 minutes, and at a temperature of 40-45° C., to result in the first polymer.

The first polymer is then combined with other ingredients according to Table 1. Similar results are likewise believed possible by variation of the amounts in Table 1 by +/−15% of the stated amounts.

TABLE 1

|  | A0 Wt % | A1 Wt % | A2 Wt % |
|---|---|---|---|
| Polymer 1 | 32.41 | 32.41 | 32.41 |
| Carbon Black | 8.27 | 8.27 | 8.27 |
| Acryloid resin | 10.31 | 10.31 | 10.31 |
| Butoxyl | 3.08 | 3.08 | 3.08 |

TABLE 1-continued

|  | A0 Wt % | A1 Wt % | A2 Wt % |
|---|---|---|---|
| MEK | 45.94 | 45.69 | 45.81 |
| EDA (ethylene diamine) | 0.00 | 0.25 | 0.13 |
| Total | 100.00 | 100.00 | 100.00 |

The samples of Table 1 provide the results of the following Table 2, when aged as described, and according to the sequences described (initial cure for 7 days at 23° C./50% Relative Humidity (RH) is further aged for 14 days at 38° C./80% RH. In an other condition samples are tested for cataplasma cycle. Quick knife adhesion testing is performed, unless otherwise stated.

TABLE 2

|  | A0 | A1 | A2 |
|---|---|---|---|
| 90 C. water bath Testing |  |  |  |
| on plate glass | 15 days ok, 16 days some PF | 14 days ok, 15 days some PF | 28 days still ok |
| on frit 24-8104 | 28 days still ok | 29 days still ok | 28 days still ok |
| Apply sealants after 20 seconds of primer open at 23° C./50% RH on plate glass |  |  |  |
| Sealant # 1 |  |  |  |
| Initial cure for 7 days at 23° C./50% RH | 90CF, 10PF | 100CF | 100CF |
| After initial cured aged for 14 days @38° C./100% RH | 100CF | 100CF | 100CF |
| Cataplasma cycle | 70CF, 30PF | 100CF | 100CF |
| 2000 hrs Weatherometer (WOM) | 80CF, 20AF | 100CF | 100CF |
| Sealant # 2 |  |  |  |
| Initial cure for 7 days at 23° C./50% RH | 100CF | 100CF | 100CF |
| After initial cured aged for 14 days @38° C./100% RH | 100CF | 90CF, 10PF | 100CF |
| Cataplasma cycle | 100CF | 100CF | 100CF |
| 2000 hrs Weatherometer (WOM) | 20AF | 90CF, 10AF | 100CF |
| Sealant # 3 |  |  |  |
| Initial cure for 7 days at 23° C./50% RH | 100CF | 80CF, 20PF | 100CF |
| After initial cured aged for 14 days @38° C./100% RH | 100CF | 100CF | 100CF |
| Cataplasma cycle | 50CF, 10AF, 40PF | 80CF, 20AF | 100CF |
| 2000 hrs Weatherometer (WOM) | 100CF | 100CF | 100CF |
| Apply sealants after 20 seconds of primer open at 23° C./50% RH on 24-8104 frit glass |  |  |  |
| Sealant # 1 |  |  |  |
| Initial cure for 7 days at 23° C./50% RH | 70CF, 30PF | 100CF | 100CF |
| After initial cured aged for 14 days @38° C./100% RH | 100CF | 100CF | 100CF |
| Cataplasma cycle | 100CF | 100CF | 100CF |
| 2000 hrs Weatherometer (WOM) | 90CF, 10AF | 100CF | 100CF |
| Sealant # 3 |  |  |  |
| Initial cure for 7 days at 23° C./50% RH | 90CF, 10AF | 100CF | 100CF |
| After initial cured aged for 14 days @38° C./100% RH | 100CF | 100CF | 100CF |
| Cataplasma cycle | 100CF | 100CF | 100CF |
| Sealant # 3 |  |  |  |
| Initial cure for 7 days at 23° C./50% RH | 100CF | 100CF | 100CF |
| After initial cured aged for 14 days @38° C./100% RH | 50CF, 50AF | 90CF, 10AF | 100CF |
| Cataplasma cycle | 70CF, 30AF | 90CF, 10AF | 100CF |
| Apply sealants after 20 seconds of primer open at 5° C./40% RH on plate glass |  |  |  |
| Sealant # 1 |  |  |  |
| Initial cure for 7 days at 23° C./50% RH | 100PF | 60CF, 40PF | 90CF, 10AF |
| After initial cured aged for 14 days @38° C./100% RH | 90CF, 10AF | 100CF | 100CF |

TABLE 2-continued

|  | A0 | A1 | A2 |
|---|---|---|---|
| Cataplasma cycle | 100CF | 100CF | 100CF |
| Sealant # 2 | | | |
| Initial cure for 7 days at 23° C./50% RH | 70CF, 30PF | 60CF, 40PF | 100CF |
| After initial cured aged for 14 days @38° C./100% RH | 100CF | 100CF | 100CF |
| Cataplasma cycle | 100CF | 100CF | 100CF |
| Sealant # 3 | | | |
| Initial cure for 7 days at 23° C./50% RH | 70CF, 30PF | 90CF, 10PF | 100CF |
| After initial cured aged for 14 days @38° C./100% RH | 100CF | 100CF | 100CF |
| Cataplasma cycle | 100CF | 100CF | 100CF |

Apply sealants after 20 seconds of primer open at 5° C./ 40% RH on 24-8104 frit glass

| Sealant #1 | 0CF | 40CF, 60PF | 100CF |
|---|---|---|---|
| Initial cure for 7 days at 23° C./50% RH | 100CF | 100CF | 100CF |
| After initial cured aged for 14 days @38° C./100% RH | 100CF | 100CF | 100CF |
| Cataplasma cycle | | | |
| Sealant # 2 | | | |
| Initial cure for 7 days at 23° C./50% RH | 20CF, 80AF | 100CF | 95CF, 5AF |
| After initial cured aged for 14 days @38° C./100% RH | 100CF | 100CF | 100CF |
| Cataplasma cycle | 100CF | 100CF | 100CF |
| 2000 hrs WOM | 90CF, 10AF | 80CF, 20AF | 100CF |
| Sealant # 3 | | | |
| Initial cure for 7 days at 23° C./50% RH | 70CF, 30AF | 100CF | 100CF |
| After initial cured aged for 14 days @38° C./100% RH | 100CF | 80CF, 20AF | 100CF |
| Cataplasma cycle | 100CF | 100CF | 100CF |

Apply sealants after 7 days of primer open at 5° C./40% RH on plate glass

| Sealant # 1 | | | |
|---|---|---|---|
| Initial cure for 7 days at 23° C./50% RH | 100CF | 100CF | 100CF |
| After initial cured aged for 14 days @38° C./100% RH | 100CF | 100CF | 100CF |
| Cataplasma cycle | 100CF with 5PF on side | 100CF | 100CF |
| Sealant # 2 | | | |
| Initial cure for 7 days at 23° C./50% RH | 80CF, 20AF | 90CF, 10AF | 100CF |
| After initial cured aged for 14 days @38° C./100% RH | 100CF | 100CF | 100CF |
| Cataplasma cycle | 100CF | 100CF | 100CF |
| Sealant # 3 | | | |
| Initial cure for 7 days at 23° C./50% RH | 90CF, 10AF | 80CF, 10AF, | 100CF |
| After initial cured aged for 14 days @38° C./100% RH | 70CF, 30AF | 100CF | 100CF |
| Cataplasma cycle | 70CF, 30AF | 100CF with 20PF at edge | 100CF |

Apply sealants after 7 days of primer open at 5° C./40% RH on frit 24-8104 glass

| Sealant # 1 | | | |
|---|---|---|---|
| Initial cure for 7 days at 23° C./50% RH | 100CF | 90CF, 10AF | 100CF |
| After initial cured aged for 14 days @38° C./100% RH | 100CF | 100CF | 100CF |
| Cataplasma cycle | 40CF, 60% smear | 100CF | 100CF |
| Sealant # 2 | | | |
| Initial cure for 7 days at 23° C./50% RH | 100CF | 100CF | 100CF |
| After initial cured aged for 14 days @38° C./100% RH | 100CF | 100CF | 100CF |
| Cataplasma cycle | 90CF, 10AF | 100CF | 100CF |

TABLE 2-continued

|  | A0 | A1 | A2 |
|---|---|---|---|
| Sealant # 3 | | | |
| Initial cure for 7 days at 23° C./50% RH | 100CF | 100CF | 100CF |
| After initial cured aged for 14 days @38° C./100% RH | 80CF, 20AF | 100CF | 100CF |
| Cataplasma cycle | 100CF | 100CF | 100CF |

Primers are applied onto glass. Within the specified open time, a sealant is applied. Sealants are applied on the specified open time primed glass and then cured for 7 days at 23° C./50% RH. The samples are then aged as described in Tables 3-8, with the expected results then reported in the tables.

TABLE 3

Adhesion properties for samples with primer open time for 20 seconds at 23° C./50% RH

| | Substrate | | | | | | | | |
|---|---|---|---|---|---|---|---|---|---|
| | Glass | Glass | Glass | Glass | Glass Primer | Glass | Glass | Glass | Glass |
| | A0 | A0 | A0 | A1 | A1 Adhesive | A1 | A2 | A2 | A2 |
| | Sealant #1 | Sealant #2 | Sealant #3 | Sealant #1 | Sealant #2 | Sealant #3 | Sealant #1 | Sealant #2 | Sealant #3 |
| Aging Time, days | 7 | 7 | 7 | 7 | 7 | 7 | 7 | 7 | 7 |
| Aging Temperature | RT | RT | RT | RT | RT | RT | RT | RT | RT |
| % cohesive failure | | | | | | | | | |
| specimen 1 | 100 | 100 | 100 | 100 | 100 | 100 | 100 | 100 | 100 |
| specimen 2 | 80 | 100 | 100 | 100 | 100 | 100 | 100 | 100 | 100 |

TABLE 4

Adhesion properties for samples with primer open for 30 days @30° C./80% RH

| | Substrate | | | | | | | | |
|---|---|---|---|---|---|---|---|---|---|
| | Glass | Glass | Glass | Glass | Glass Primer | Glass | Glass | Glass | Glass |
| | A0 | A0 | A0 | A1 | A1 Adhesive | A1 | A2 | A2 | A2 |
| | Sealant #1 | Sealant #2 | Sealant #3 | Sealant #1 | Sealant #2 | Sealant #3 | Sealant #1 | Sealant #2 | Sealant #3 |
| | Age samples 7 days at room temperature | | | | | | | | |
| % cohesive failure | 100 | 100 | 20 | 100 | 100 | 100 | 100 | 100 | 100 |
| | Age samples 14 days at 90° C. | | | | | | | | |
| % cohesive failure | 100 | 100 | 60 | 100 | 70 | 100 | 100 | 100 | 100 |
| | Age samples 14 days at 38° C./100% relative humidity | | | | | | | | |
| % cohesive failure | 100 | 100 | 100 | 100 | 100 | 100 | 100 | 100 | 100 |

TABLE 5

Adhesion properties for samples with primer open for 60 days @30° C./80% RH

| | | | | | Substrate | | | | |
|---|---|---|---|---|---|---|---|---|---|
| | Glass | Glass | Glass | Glass | Glass Primer | Glass | Glass | Glass | Glass |
| | A0 | A0 | A0 | A1 | A1 Adhesive | A1 | A2 | A2 | A2 |
| | Sealant #1 | Sealant #2 | Sealant #3 | Sealant #1 | Sealant #2 | Sealant #3 | Sealant #1 | Sealant #2 | Sealant #3 |
| Age samples 7 days at room temperature | | | | | | | | | |
| % cohesive failure | 100 | 0 | 0 | 100 | 100 | 100 | 100 | 100 | 100 |
| Age samples 14 days at 90° C. | | | | | | | | | |
| % cohesive failure | 100 | 100 | 70 | 60 | 100 | 100 | 100 | 100 | 100 |
| Age samples 14 days at 38° C./100% relative humidity | | | | | | | | | |
| % cohesive failure | 100 | 100 | 70 | 100 | 100 | 100 | 100 | 100 | 100 |

TABLE 6

Adhesion properties for samples with primer open for 90 days @30° C./80% RH

| | | | | | Substrate | | | | |
|---|---|---|---|---|---|---|---|---|---|
| | Glass | Glass | Glass | Glass | Glass Primer | Glass | Glass | Glass | Glass |
| | A0 | A0 | A0 | A1 | A1 Adhesive | A1 | A2 | A2 | A2 |
| | Sealant #1 | Sealant #2 | Sealant #3 | Sealant #1 | Sealant #2 | Sealant #3 | Sealant #1 | Sealant #2 | Sealant #3 |
| Age samples 7 days at room temperature | | | | | | | | | |
| % cohesive failure | 100 | 50 | 100 | 100 | 100 | 100 | 100 | 100 | 100 |
| Age samples 14 days at 90° C. | | | | | | | | | |
| % cohesive failure | 100 | 100 | 70 | 100 | 100 | 100 | 100 | 100 | 100 |
| Age samples 14 days at 38° C./100% relative humidity | | | | | | | | | |
| % cohesive failure | 100 | 0 | 100 | 100 | 100 | 100 | 100 | 100 | 100 |

TABLE 7

Cataplasma cycle testing for samples with primer open for 20 seconds

| | | | | | Substrate | | | | |
|---|---|---|---|---|---|---|---|---|---|
| | Glass | Glass | Glass | Glass | Glass Primer | Glass | Glass | Glass | Glass |
| | A0 | A0 | A0 | A1 | A1 Adhesive | A1 | A2 | A2 | A2 |
| | Sealant #1 | Sealant #2 | Sealant #3 | Sealant #1 | Sealant #2 | Sealant #3 | Sealant #1 | Sealant #2 | Sealant #3 |
| | | | | Test for 1 cataplasma cycles | | | | | |
| % cohesive failure | 100 | 100 | 100 | 100 | 100 | 100 | 100 | 100 | 100 |
| Blistering | some | some | some | none | none | none | none | none | none |
| | | | | Test for 2 cataplasma cycles | | | | | |
| % cohesive failure | 80 | 100 | 100 | 100 | 100 | 100 | 100 | 100 | 100 |
| Blistering | slight | slight | slight | none | none | none | none | none | none |
| | | | | Test for 3 cataplasma cycles | | | | | |
| % cohesive failure | 100 | 70 | 100 | 50 | 100 | 100 | 100 | 100 | 100 |
| Blistering | slight | slight | slight | none | none | none | none | none | none |

TABLE 8

Cataplasma cycle testing for samples with primer open for 14 days @38° C./100% RH

| | | | | | Substrate | | | | |
|---|---|---|---|---|---|---|---|---|---|
| | Glass | Glass | Glass | Glass | Glass Primer | Glass | Glass | Glass | Glass |
| | A0 | A0 | A0 | A1 | A1 Adhesive | A1 | A2 | A2 | A2 |
| | Sealant #1 | Sealant #2 | Sealant #3 | Sealant #1 | Sealant #2 | Sealant #3 | Sealant #1 | Sealant #2 | Sealant #3 |
| | | | | Test for 1 cataplasma cycles | | | | | |
| % cohesive failure | 20 | 100 | 100 | 100 | 100 | 100 | 100 | 100 | 100 |
| Blistering | slight | slight | slight | none | none | none | none | none | none |
| | | | | Test for 2 cataplasma cycles | | | | | |
| % cohesive failure | 100 | 70 | 100 | 100 | 100 | 100 | 100 | 100 | 100 |
| Blistering | slight | slight | slight | none | none | none | none | none | none |
| | | | | Test for 3 cataplasma cycles | | | | | |
| % cohesive failure | 100 | 100 | 100 | 100 | 80 | 100 | 100 | 100 | 100 |
| Blistering | slight | slight | slight | none | none | none | None | None | none |

The characterizations of chemical structures or chemical functionalities are intended to be illustrative and not limiting. For example, it is understood that upon reading the above description, other chemical structures for the first and second oligomers would be apparent to one skilled in the art.

While a feature of the present invention may have been described in the context of only one of the illustrated embodiments, such feature may be combined with one or more other features of other embodiments, for any given application. It will also be appreciated from the above that the fabrication of the unique compounds and blends herein and the use thereof also constitute processes in accordance with the present invention.

Unless stated otherwise, plural structural components or steps can be provided by a single integrated structure or step. Alternatively, a single integrated structure step might be divided into separate plural components or steps. However, it is also possible that the functions are integrated into a single component or step. Moreover, the disclosure of "a" or "one" element or step is not intended to foreclose additional elements or steps. The use of "to" within a range contemplates inclusion of the endpoints of the range within the range.

The use of "about" or "approximately" in connection with a range applies to both ends of the range. Thus, "about 20 to 30" is intended to cover "about 20 to about 30", inclusive of at least the specified endpoints.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A bonding agent, comprising: from about 3 to 60% by weight of the total bonding agent weight, of a first polymer, the first polymer comprising the reaction product of:
   a) from about 15 to 85% by weight, based on the total weight of the first polymer, of a first oligomer, wherein the first oligomer comprises the reaction product of:
      i. a first component that includes an epoxy functional silane having an epoxy functionality of about 1, and
      ii. a second component that includes monomer having an amine functionality greater than 1,
      reacted at a ratio such that the first oligomer contains reactive functional groups selected from primary amine, secondary amine, hydroxyl or any combination thereof; and
   b) from about 15 to 85% by weight, based on the total weight of the first polymer, of a second oligomer, wherein the second oligomer comprises the reaction product of
      i. a third component that includes a monomeric isocyanate having functionality of greater than about 1.9,
      ii. and a fourth component that includes a monomer having an active hydrogen, which can react with the isocyanate,
   wherein the first oligomer and the second oligomer are reacted in a ratio such that the second oligomer contains reactive isocyanate functionality; and the first polymer is substantially devoid of free isocyanate functionality;
   wherein the bonding agent is a one-component composition that exhibits an open time of at least 30 seconds.

2. The bonding agent of claim 1 wherein the first component is an epoxy functional silane selected from glycidoxyalkyl trialkoxysilanes, beta-(3,4-epoxycyclohexyl) ethyltrimethoxysilane or a combination thereof, the second component is selected from a polyol or an amine functional monomer selected from the group comprising of an alkyldiamine, an aryldiamine, an alkoxydiamine, an amine functional alkoxy silane, and any combination thereof, the third component is selected from trimethyl diisocyanatohexane, diphenylmethane diisocyanate, isophorene diisocyanate, hexamethylene diisocyanate, toluene diisocyanate or any combination thereof, the fourth component is selected from a mercapto-trialkoxy-silane, an amino-trialkoxy silane or a combination thereof, or combinations thereof.

3. The bonding agent of claim 1, wherein the amine functional monomer is selected from gamma-aminopropyltriethoxysilane, gamma-aminopropyltrimethoxysilane, N-beta-(aminoethyl)-gamma-aminopropyltrimethoxysilane, a triaminofunctional silane, N-beta-(aminoethyl)-gamma-aminopropylmethyldimethoxysilane or any combination thereof.

4. The bonding agent of claim 1, wherein the first component includes gamma-glycidoxypropyl trimethoxysilane, the second component includes N-beta-(aminoethyl)-gamma-aminopropyltrimethoxysilane, the third component includes trimethyl diisocyanatohexane, and the fourth component includes mercaptopropyl trimethoxysilane.

5. The bonding agent of claim 4 further comprising one or more additives selected from the group consisting of an acrylic copolymer film forming resin, butoxyl, carbon black, ethylene diamine, and a solvent.

6. The bonding agent according to claim 1 wherein the fourth component includes a monomer having a single active hydrogen.

7. The bonding agent according to claim 1 further comprising from about 0.1 to 5% by weight of the overall bonding agent composition of a (poly)alkylene amine.

8. The bonding agent according to claim 1 further comprising up to about 25% by weight of the overall bonding agent composition of a silyl terminated polymer.

9. The bonding agent according to claim 5 comprising surface treated carbon black having a pH or from about 4 to about 6.

10. The bonding agent of claim 7, wherein the (poly)alkylene amine is ethylene diamine.

11. The bonding agent of claim 10, further comprising up to about 25% by weight of the overall bonding agent composition of a film forming resin.

12. The bonding agent of claim 11, further comprising less than about 20% by weight of the total bonding agent weight, of a filler.

13. The bonding agent of claim 12, further comprises up to about 80% by weight of the total bonding agent composition weight, of a solvent.

14. The bonding agent of claim 10, wherein the film forming resin is a polymer selected from a polyacrylate resins, epoxy resins, polyester resins, polyester copolymers, polyvinyl chloride resins, chlorinated rubber, ethylene vinyl acetate copolymers, polyacrylate copolymers, and any combination thereof.

15. A method of bonding a glass panel to a vehicle structure, comprising the steps of (a) applying a bonding agent comprising from about 3 to 60% by weight of the total bonding agent weight, of a first polymer, the first polymer comprising the reaction product of (A) from about 15 to 85% by weight, based on the total weight of the first polymer, of a first oligomer, wherein the first oligomer comprises the reaction product of (i) a first component that includes an epoxy functional silane having an epoxy functionality of about 1, and (ii) a second component that includes monomer having an amine functionality greater than 1, reacted at a ratio such that the first oligomer contains reactive functional groups selected from primary amine, secondary amine, hydroxyl or any combination thereof; and (B) from about 15 to 85% by weight, based on the total weight of the first polymer, of a second oligomer, wherein the second oligomer comprises the reaction product of (i) a third component that includes a monomeric isocyanate having functionality of greater than about 1.9, (ii) and a fourth component that includes a monomer having an active hydrogen, which can react with the isocyanate, wherein the first oligomer and the second oligomer are reacted in a ratio such that the second oligomer contains reactive isocyanate functionality; and the first polymer is substantially devoid of free isocyanate functionality; and wherein the bonding agent is a one-component composition that exhibits an open time of at least 30 seconds substantially along the periphery of one side of a glass panel (b) superimposing on the bonding agent composition a bead of an adhesive; and (c) installing the glass panel by contacting the adhesive with a vehicle structure defining an opening for receiving the glass panel.

16. The method according to claim 15 wherein the fourth component includes a monomer having a single active hydrogen.

17. The method according to claim 15 wherein the bonding agent further comprises from about 0.1 to 5% by weight of the overall bonding agent composition of a (poly)alkylene amine.

18. The method according to claim 15 wherein the bonding agent further comprises up to about 25% by weight of the overall bonding agent composition of a silyl terminated polymer.

19. The method according to claim 15 wherein the bonding agent further comprises surface treated carbon black having a pH or from about 4 to about 6.

* * * * *